(12) United States Patent
Flettner (10) Patent No.: US 7,815,779 B2
(45) Date of Patent: Oct. 19, 2010

(54) WATER TREATMENT DEVICE

(76) Inventor: Marc Flettner, Mühlenbergweg 18, Düsseldorf 40629 (DE)

( * ) Notice: Subject to any disclaimer, the term of this patent is extended or adjusted under 35 U.S.C. 154(b) by 1086 days.

(21) Appl. No.: 10/560,271

(22) PCT Filed: May 25, 2004

(86) PCT No.: PCT/EP2004/005604

§ 371 (c)(1), (2), (4) Date: Apr. 17, 2006

(87) PCT Pub. No.: WO2004/108607

PCT Pub. Date: Dec. 16, 2004

(65) Prior Publication Data

US 2006/0231503 A1 Oct. 19, 2006

(30) Foreign Application Priority Data

Jun. 10, 2003 (DE) ................ 103 26 490

(51) Int. Cl.
*C02F 1/461* (2006.01)

(52) U.S. Cl. ............... 204/248; 205/745; 210/748.18

(58) Field of Classification Search ........... None
See application file for complete search history.

(56) References Cited

U.S. PATENT DOCUMENTS

| | | | | |
|---|---|---|---|---|
| 3,677,522 A | * | 7/1972 | Hargash | 366/178.1 |
| 3,974,071 A | * | 8/1976 | Dunn et al. | 210/696 |
| 4,248,690 A | * | 2/1981 | Conkling | 204/268 |
| 4,789,448 A | | 12/1988 | Woodhouse | |
| 5,215,375 A | * | 6/1993 | Ditzler et al. | 366/337 |
| 5,368,705 A | * | 11/1994 | Cassidy | 204/248 |
| 6,267,883 B1 | * | 7/2001 | Weaver et al. | 210/198.1 |
| 7,135,155 B1 | * | 11/2006 | Long et al. | 422/224 |
| 2006/0042958 A1 | * | 3/2006 | Cole | 205/745 |

FOREIGN PATENT DOCUMENTS

| | | |
|---|---|---|
| CN | 2083148 U | 8/1991 |
| DE | 19857730 A1 | 7/1999 |
| DE | 10004912 A1 | 8/2000 |
| DE | 10146961 A1 | 4/2003 |
| EP | 1046 616 | 10/2000 |
| GB | 191409396 | 4/1915 |
| GB | 2279663 A | 1/1995 |

(Continued)

OTHER PUBLICATIONS

Office Action from The Patent Office of the People's Republic of China.

(Continued)

*Primary Examiner*—Harry D Wilkins, III
(74) *Attorney, Agent, or Firm*—Chadbourne & Parke LLP; Walter G. Hanchuk (57) ABSTRACT

The invention relates to a water treatment device comprising a metallic sleeve inside which at least one metallic sacrificial anode is disposed, said sacrificial anode being connected to the sleeve in an electrically conducting manner. At least one metallic swirling member which generates eddies within the water flow is arranged upstream of a sacrificial anode in the sleeve, particularly in order to cause the sacrificial anode to be cleaned by means of the turbulent water flow.

15 Claims, 8 Drawing Sheets

FOREIGN PATENT DOCUMENTS

| | | |
|---|---|---|
| JP | 63-86896 | 6/1988 |
| JP | 4-000987 | 1/1992 |
| JP | 4-17899 | 2/1992 |
| JP | 4-110091 | 4/1992 |
| JP | 8-505809 | 8/1994 |
| JP | 9-1152 | 1/1997 |
| JP | 9-85292 | 3/1997 |
| WO | WO 97/11908 A2 | 4/1997 |

OTHER PUBLICATIONS

International Preliminary Report On Patentability, issued May 1, 2006, in corresponding International Application No. PCT/EP2004/005604.

* cited by examiner

Figur 1

Figur 2

Figur 3

Figur 4

Figur 7

Figur 8

Figur 9

WATER TREATMENT DEVICE

FIELD OF THE INVENTION

The invention concerns a water treatment unit which includes a metallic casing in which at least one metallic reacting anode is arranged, which is connected to the outer housing in an electrically conducting manner.

BACKGROUND OF THE INVENTION

Such water treatment units for use in water piping networks are known in the state of the art, for instance in U.S. Pat. No. 3,974,071. This document describes a water treatment unit with a metallic casing in which a reacting anode is placed, spirally wound along the direction of the flow. The spiral form is to create a close contact between the water and the surface of the anode.

The effect of such water treatment units is based on an electrogalvanic principle in which a conducting connection between two non-similar metals, due to the different values of these metals, causes one of the metals as the reacting anode to release its metal ions into the water. It has been shown that such metal ions release causes positive effects, for instance by building up an anti-corrosion layer on the pipe interior of a water piping network in which such a water treatment unit is contained.

It has likewise been observed that the release of metal ions leads to an agglomeration of substances contained in the water, for instance scale forming substances, which results in a particle size of these substances that is larger by comparison to untreated water—presumably due to seeding on the metal ions. Particularly due to the enlargement of the substances in the water due to agglomeration, fewer of these substances can deposit themselves in the subsequent regions of the water piping network, so that a water piping network which possesses such a water treatment unit will keep its effective interior pipe diameter free of deposits. Without such a water treatment unit, there is a recognizable tendency for water pipes to gradually grow shut inside, from the outer edge towards their center, for instance due to calcium deposits.

SUMMARY OF THE INVENTION

Since the significant effect of such water treatment units is based on the undisturbed release of metal ions from the reacting anode, the optimal operation of a water treatment unit of this type makes it necessary to ensure that an even release of metal ions remains guaranteed in the course of the operating period. With other water treatments which are known in the state of the art, it is found that the reacting anodes lose their optimal effect in the course of time due to contamination, so that fewer and fewer metal ions are released into the water over time, and the positive effects of known water treatment units gradually lessen.

The object of the invention is to form a water treatment of this type in such a way that optimal activity of the metal ion release from the reacting anode is maintained over a long time period.

This task is solved by the invention in that the housing contains, in the direction of the flow ahead of the reacting anode, at least one metallic turbulence body which causes turbulence in the water current.

Particularly with low water flow speed, laminar water currents may occur in water piping networks within the pipes, wherein the flow speed in the area of the pipe walls is very low. Reacting anodes which are placed in this area or reacting anodes which possess a canal or pipe form are only touched by a slow water flow at their surfaces, so that contamination may deposit itself on these surfaces, leading to a reduction in the ion release and thereby the positive effects of the water treatment unit.

Due to the use of metallic turbulence bodies in the invention which are arranged in the direction of flow ahead of a reacting anode, water turbulence is caused ahead of or around a reacting anode, so that the turbulent water flow can have a cleansing effect on the reacting anode to prevent the deposit of contaminants and thereby maintain the effectiveness of the reacting anode for long time periods. The turbulence which is caused in the flowing water in the invention furthermore also leads to an increased release of metal ions from the reacting anode, thereby further increasing the positive effect of such a water treatment unit. The turbulence bodies safely make a possibly laminar current turbulent or further disturb a turbulent current.

The use of at least one turbulence body made from metal furthermore has the advantage that by comparison to other materials, such a turbulence body has a particularly long service life, so that a water treatment unit as in the invention exhausts itself merely through the gradual consumption of the one or several reacting anodes.

In order to generate the electrogalvanic effect, non-similar metals can be used for the housing and at least one reacting anode, which is positioned therein. For instance, red brass can be used for the housing, and, for instance, zinc for the reacting anode. Specialists are furthermore able to select other customary metal combinations.

Stainless steel is preferred for the metallic turbulence bodies, since this material possesses a particularly long service life due to its hardness and corrosion resistance. A further additional precious metal coating may be utilized. Furthermore, any existing electrogalvanic effect between a stainless steel turbulence body and the other metals of the water treatment unit is very low, so that a tendency of the metallic turbulence body to act as a reacting anode itself is very low.

In order to avoid disturbances in the electrogalvanic effect between a reacting anode and the metallic casing and furthermore prevent a tendency of the metallic turbulence bodies themselves to act as reacting anodes, it may be preferable to insulate the turbulence body itself against direct electrical contact with a reacting anode.

For instance, a gap may be provided in a neighboring arrangement of a metallic turbulence body and a reacting anode, particularly by use of a spacer placed between these elements. On the other hand, the gap creates insulation between the turbulence body and the reacting anode. Either the spacer itself is formed out of an insulating material, or, if the spacer is metallic, it can be arranged in an insulating manner towards the turbulence body and/or the reacting anode, for instance by adding an insulating element between them.

Furthermore, the gap can ensure that particularly strong turbulence is created behind the turbulence body, therefore leading to increased cleansing activity and increased ion release from the reacting anode.

In addition to the previously described embodiment of insulation between the metallic turbulence body and the reacting anode, it may be particularly preferred to arrange a metallic turbulence body within the housing so that it is completely insulated both from the reacting anode and from the metallic casing. This can take place through the use of corresponding insulation elements in or between which a turbulence body is embedded.

In another preferred embodiment, it may be intended that a turbulence body is arranged before and behind at least one reacting anode. This has the constructive advantage that in the installation of a water treatment unit in accordance with the invention into a water piping network, no installation direction must be taken into account, since there is always a turbulence body ahead of a reacting anode in the flow direction regardless of the direction of installation. The arrangement of a turbulence body in the flow direction behind the reacting anode furthermore has the greatest advantage by far in the invention that the released metal ions of the reacting anode are distributed particularly well. In the arrangement of the turbulence bodies both ahead of and behind at least one reacting anode, it may also be intended in addition that turbulence bodies are turned by 90 degrees in their orientation to the direction of flow.

Since turbulence bodies resist the water current in the direction of flow by necessity, it may also be intended that a turbulence body is locally fixed within the metallic casing in its position, by means of a securing element.

To obtain good turbulence of the water by the use of a metallic turbulence body as in the invention, a simple version may intend to form such a turbulence body through at least one element which is suitable for the passage of water through it, being formed with holes and/or channels, particularly a perforated plate. Specialists understand such a plate to be an element with a wide expansion by comparison to its thickness.

For instance, at least one such perforated plate can be arranged so that its plane is vertical or in another orientation to the direction of the water flow. Simply by water flowing through the holes of such a perforated plate, sufficient turbulence may be created behind such a perforated plate.

It may preferably be intended that a turbulence body includes a variety of perforated plates, which are varyingly oriented in relation to each other. To prevent shifting of the perforated plates in relation to each other and thereby also avoid noise development within the metallic casing, it may be intended that the individual perforated plates which are included in a turbulence body are fastened to each other. This can take place through measures with which specialists are familiar, such as welding, soldering, gluing or by a plug connection. Likewise, it may be intended to produce such a turbulence body in one piece, for instance, through a metal casting process.

In the case of fastening to each other by means of a plug connection, it may be intended that the various perforated plates possess plug elements which plug into corresponding hole elements in other perforated plates, wherein, for instance, the hole elements may be realized by the holes themselves in such a perforated plate. Furthermore, the plug elements may result from the remaining rails between the holes on a face side of a perforated plate.

In a further embodiment or alternatively to the previously named constructions, it may also be intended that a turbulence body includes a particularly holed plate or similar element which is preferably spirally wound in the flow direction. This enables the creation of a water flow which is spirally formed through and around a reacting anode, with the corresponding desired cleansing effect and increased ion release.

It may likewise be intended that a turbulence body is formed by two holed perforated plates which are arranged vertically to the direction of flow at a distance to each other, between which there is at least one further, particularly perforated plate. The vertically arranged, preferably perforated plates can possess a cross-section which largely corresponds to the internal cross-section of the metallic casing in this place.

The cross-section of the metallic casing and the perforated plates is commonly circular. The two holed perforated plates which are arranged behind each other, between which there is preferably, but not necessarily, a further, preferably holed plate may be arranged in such a manner that the holes which are respectively arranged in the perforated plates may be offset in relation to each other in the flow direction, so that there is no undisturbed path in the flow direction for the water as it flows through the holes in the subsequently arranged perforated plate.

A further disturbance which causes turbulence can be obtained by placing at least one further, particularly perforated plate between the vertical perforated plates. Such a further, single perforated plate which is arranged between the plates can, for instance, be oriented in its plane in the axial direction of the housing. In the case of two further plates which are arranged between the vertical perforated plates, it may be intended that these two perforated plates, depending on the perspective of observation, are arranged so that they run towards each other or away from each other, that is, graphically, largely in a V shape towards each other. Greater numbers of further, preferably perforated, plates may also be arranged between the vertical plates.

In the construction of a turbulence body, it may be intended that this includes at least one perforated plate, which includes a large number of holes with various cross-section shapes and/or cross section sizes. Therefore, a perforated plate may include circular holes in various diameters, but also holes with various cross-section shapes, thereby also with angular cross-sections or circle segment shaped cross-sections within a perforated plate.

It is significant for a turbulence body that it prevents undisturbed water flow and thereby leads to turbulence. The concrete execution of the turbulence body is principally irrelevant to this, and is not restricted to the previously named and subsequently described embodiments.

BRIEF DESCRIPTION OF THE DRAWINGS

Various embodiments of a water treatment unit in accordance with the invention are explained in further details in the following illustrations. The following are shown.

DETAILED DESCRIPTION OF THE INVENTION

Figure 1:
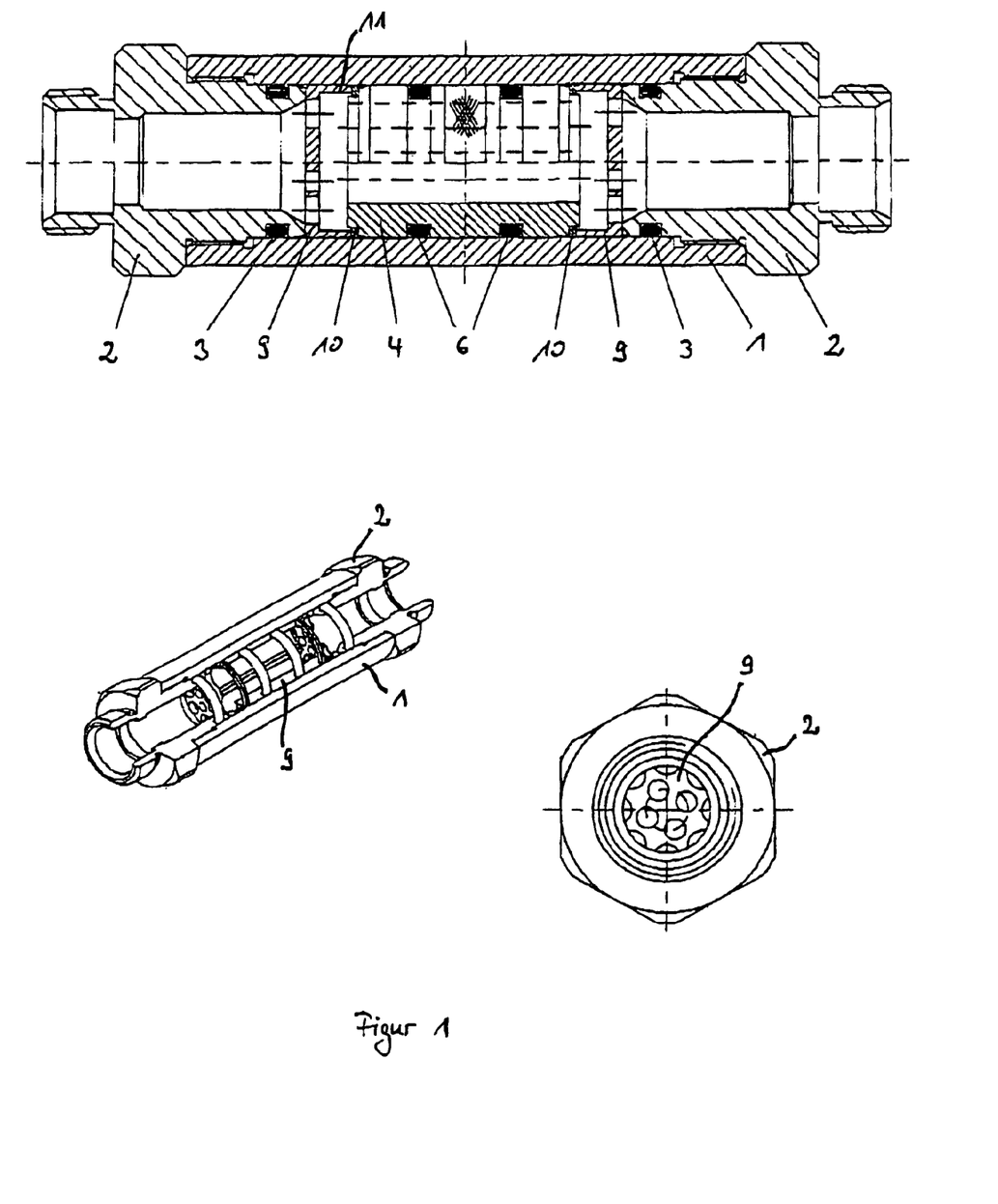
FIG. 1 a water treatment unit with a single perforated plate which is arranged vertically to the direction of water flow with a gap to the reacting anode FIG. 2 a water treatment unit with a turbulence body that possesses flow channels FIG. 3 water treatment unit with a turbulence body from two perforated plates arranged perpendicular to the direction of the flow with an additional perforated plate arranged in between FIG. 4 a turbulence body with two additional perforated plates arranged in a V formation between two perforated plates arranged perpendicular to the direction of the flow FIG. 5 a similar arrangement to that in FIG. 4, whereby the two additional perforated plates that are between the perforated plates that are perpendicular to each other have an increased space between them FIG. 6 water treatment unit with two reacting anodes and a turbulence body, which is screw-shaped FIG. 7 typical reacting anode design FIG. 8 a turbulence body in accordance with the design referred to in FIG. 3

FIG. 1 shows, in a perspective and a sectional view, the design of water treatment unit with a metallic casing 1 according to the patent that is, for example, manufactured from red bronze. The metallic casing 1 shows the fittings 2 on their respective end areas for connection in an existing water channel network as an example, whereby these fittings in the case diagrammed here, show the fittings with an external screw thread for connection to the water channel network. The fittings 2 are joined with the metallic casing 1 by means of a watertight o-ring 3 in each case.

Water treatment unit of this type can have any other type of fitting aside from the fittings 2, for example with internal screw threads or with flanges or similar assembly possibilities. Likewise, it can be possible that the fittings can be joined with the casing as one piece or that the casing itself has the appropriate screw threads or flanges. The water treatment unit portrayed can have any nominal value, for example DN08 to DN250 are preferred so that an insertion in any water channel network can take place.

In addition to the insertion in the water channel equipment it can be designed so that the treatment equipment could be used for other fluids in which a similar or the same effect could be achieved as that previously described in water.

Within the water treatment unit, according to FIG. 1, a metallic reacting anode 4 is arranged approximately in the middle of the casing 1 in the present case, whereby this reacting anode uses the metallic, zinc, as an example and shows a preference for an inner electrical contact to casing 1.

Figure 7:
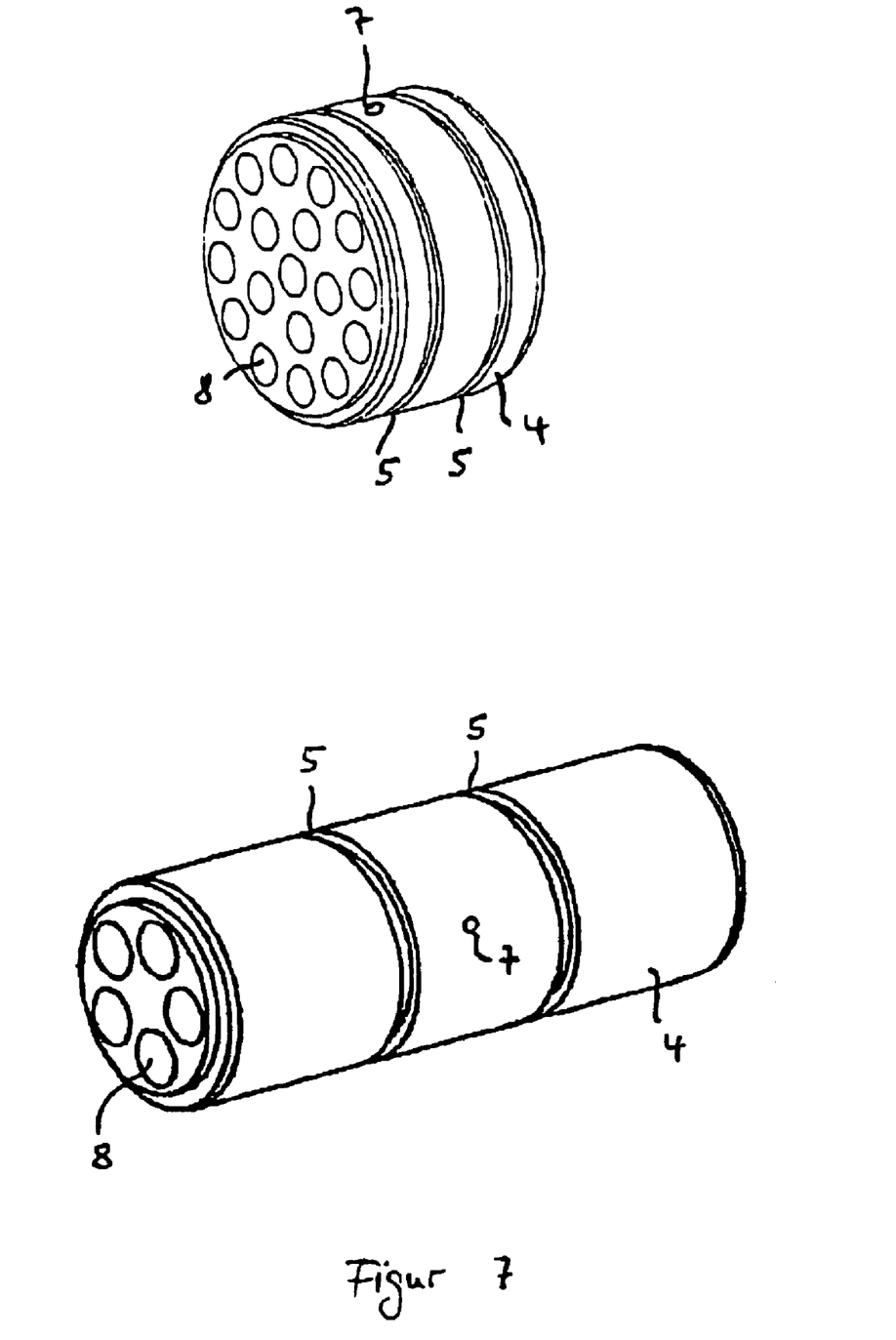
Figure 8:
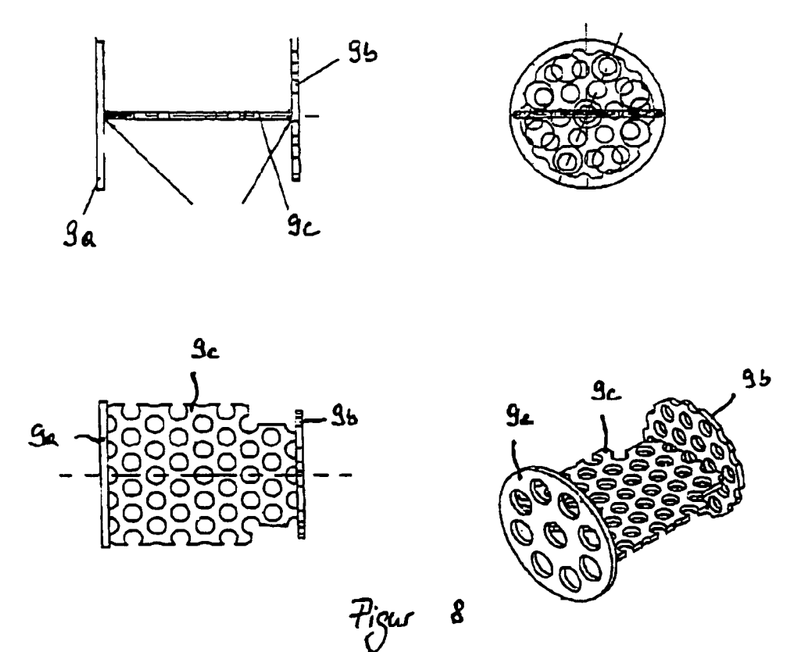

A model of this reacting anode is portrayed especially clearly in FIG. 7, whereby it is evident here that the reacting anode 4 shows one in a generally cylindrical design out of a solid zing material, whereby the external diameter of a reacting anode of this type is fitted to the inner diameter of the metallic casing 1, so that an inner electrical contact exists between these.

In order to prevent water from creeping between the reacting anode and the metallic casing 1 and thus to ensure a dry contact between reacting anode 4 and casing 1, it can preferably be designed as shown here, that the cylindrical reacting anodes body has two spaced circular notches 5 on its shell, in which an o-ring 6 can be inserted in each case. Through this, it will be ensured that at a minimum, the area 7 of a sacrificial node, found between the two notches 5, will provide a dry contact surface to the metallic casing 1.

Figure 6:
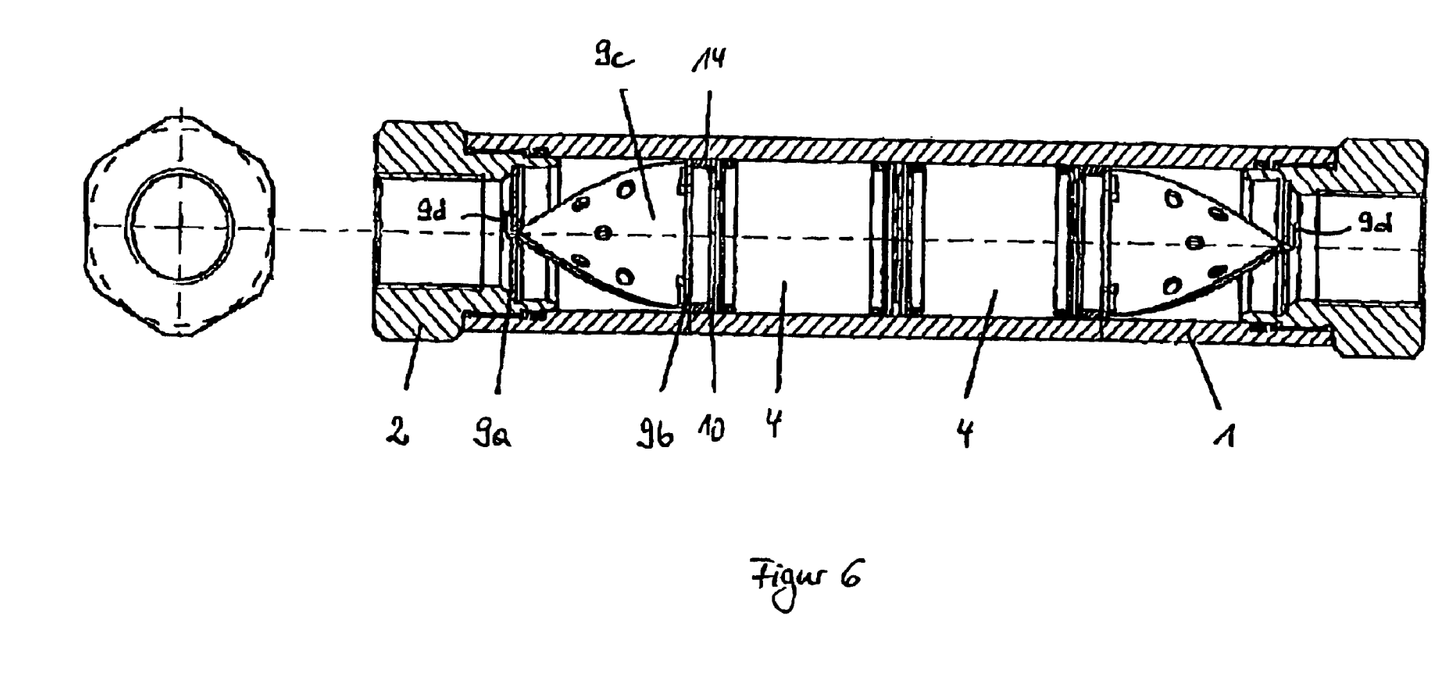

In FIG. 1 and also in FIG. 6, it is evident that multiple holes 8 are extruded in the cylindrical reacting anode body 4, made from a solid zing material, to form channels, in order to ensure within the metal casing 1 water flow through the reacting anode 4. In this manner, as is described in FIG. 6 in both exemplary reacting anodes 4, various numbers of channels, also including those with various diameters within the reacting anode 4 can be realized. The effective surface area of the reacting anode comprises the front side, which is perpendicular to the direction of water flow and, in particular, the inner walls of the canals 8 in the reacting anode 4.

Fundamentally, the design of the reacting anode 4 is completely irrelevant with regard to the inventive aspects of the results.

FIG. 1 again shows that in the direction of the flow before and also in the direction of the flow after the reacting anode 4 respectively, a turbulence body 9 is arranged within the metallic casing 1, in order to ensure a turbulence of the flowing water in particular before, in and after a reacting anode, in order to realize a cleaning and also, in particular, an increased ionic discharge.

In order to prevent a direct electrical contact between a turbulence body 9 and the reacting anode 4, an insulating element 10 is arranged between these two, which in the present case is designed in the form of a ring that is placed around a forward springing surface of the reacting anode.

In order to achieve a spacing of the turbulence body 9 to the reacting anode, this is designed with a spacer 11 that in the present case is designed as a forward springing flange, which is molded directly on the turbulence body 9 as a single piece or alternatively arranged as a pre-mounted ring.

In particular, in viewing the front side of the water treatment unit according to the patent, it is obvious that holes of various diameters are arranged in the turbulence body. In this way, it can be designed in particular that the individual holes, or the holes in general, of a turbulence application can at least be partially arranged in offset positions compared to the continuous channels 8 arranged in a reacting anode 4, in order to prevent the flowing water from finding an uninterrupted route in the axial direction of the casing.

In the design in accordance with FIG. 1, the turbulence body 9 is fixed in place, which is, in the present case, achieved by clamping it in between the reacting anode 4 and the fitting 2. Through the bilateral clamping to the reacting anode, a tighter fit of all elements in the casing 1 is ensured in total.

The above-mentioned fundamental properties of water treatment unit, such as specifications and details regarding materials as well as properties apply likewise to all of the other details, which are to follow.

Figure 2:
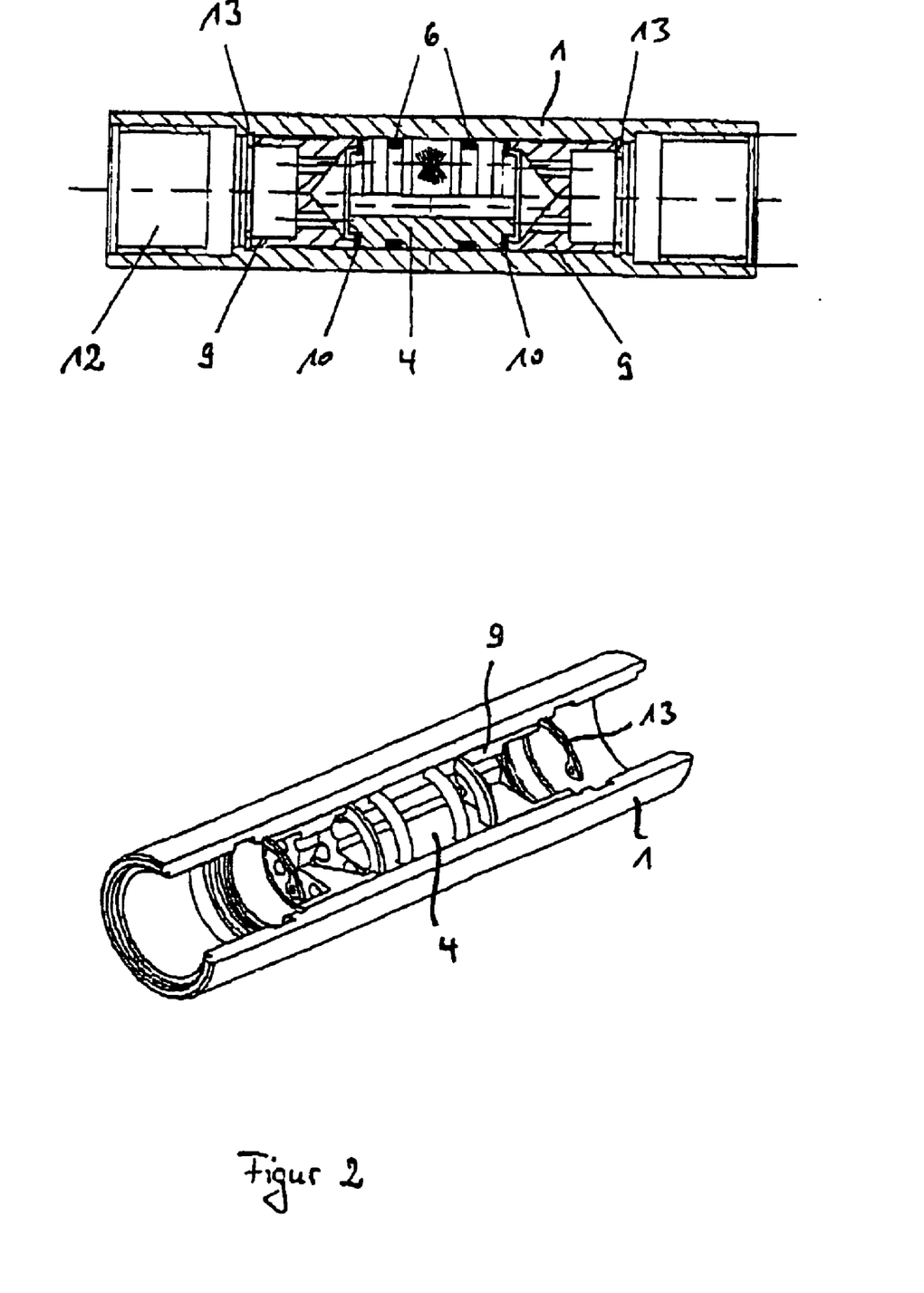

FIG. 2 shows another alternative design of the water treatment unit according to the patent with reacting anodes 4, which again are essentially identical in construction to those in FIG. 6, whereby in this case, the connection areas of the metallic casing 1 are realized through an inside thread 12, which is arranged in the casing.

In turn, in the direction of the flow before and after the reacting anode 4, a turbulence body 9 is arranged and separated by means of an insulating ring 10, which however is designed presently from a generally cylindrical element, which also looks like the reacting anode 4 through holes. In this way, the forward leaning front side of the reacting anode 4 of a turbulence body 9 shows a recess, which is generally conical, in order to ultimately create a space between the front side of the turbulence body 9 and the reacting anode 4.

Presently, the turbulence body 9 is secured by means of a retainer 13 between itself and the reacting anode within the metallic casing 1.

Figure 3:
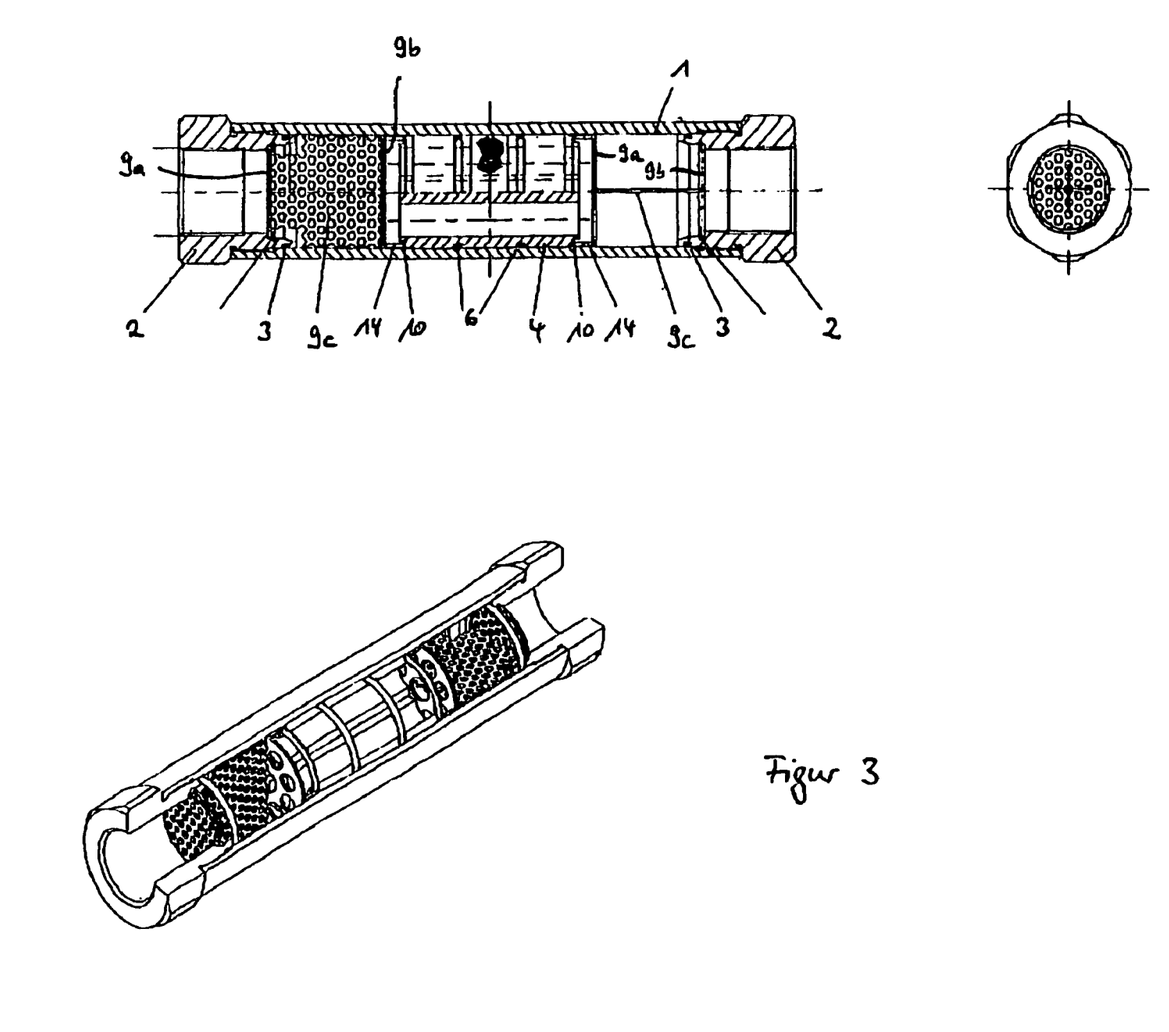

Like FIG. 2, FIG. 3 shows an additional design in accordance with the patent with essentially the same reacting anode 4, whereby the existing turbulence body 9 will comprise a first perforated plate 9a, arranged perpendicular to the direction of the flow, and a second perforated plate 9b, likewise arranged, spaced away from the first, between which an additional perforated plate 9c will be extended, whereby the perforated plate 9c is preferably arranged on the middle axis of the casing.

The turbulence body 9 is held in this design by a spacer 14 in the form of a metallic ring, for example across from the reacting anode 4, whereby here again an insulating ring 10 is arranged, as described before, between the spacer 14 and the reacting anode 4.

In FIG. 3 it is obvious that both turbulence bodies 9, which are arranged in the direction of the flow before and behind the reacting anode 4, are turned in their orientation by 90 degrees.

In turn it is evident, particularly in the perspective view in FIG. 3, that the number and diameter of the holes in the perforated plates 9a and 9b, which are respectively perpendicular to the direction of the flow, are different.

The design of the turbulence bodies in accordance with FIG. 3 is particularly evident in FIG. 7, as well. Here it is shown specifically at the top right of the diagram that there is a partial overlapping of the holes for the chosen hole arrangement with the different numbers and diameters, so that the water can only flow through a few uninterrupted areas in its flow direction, which leads to strong turbulence.

Figure 4:
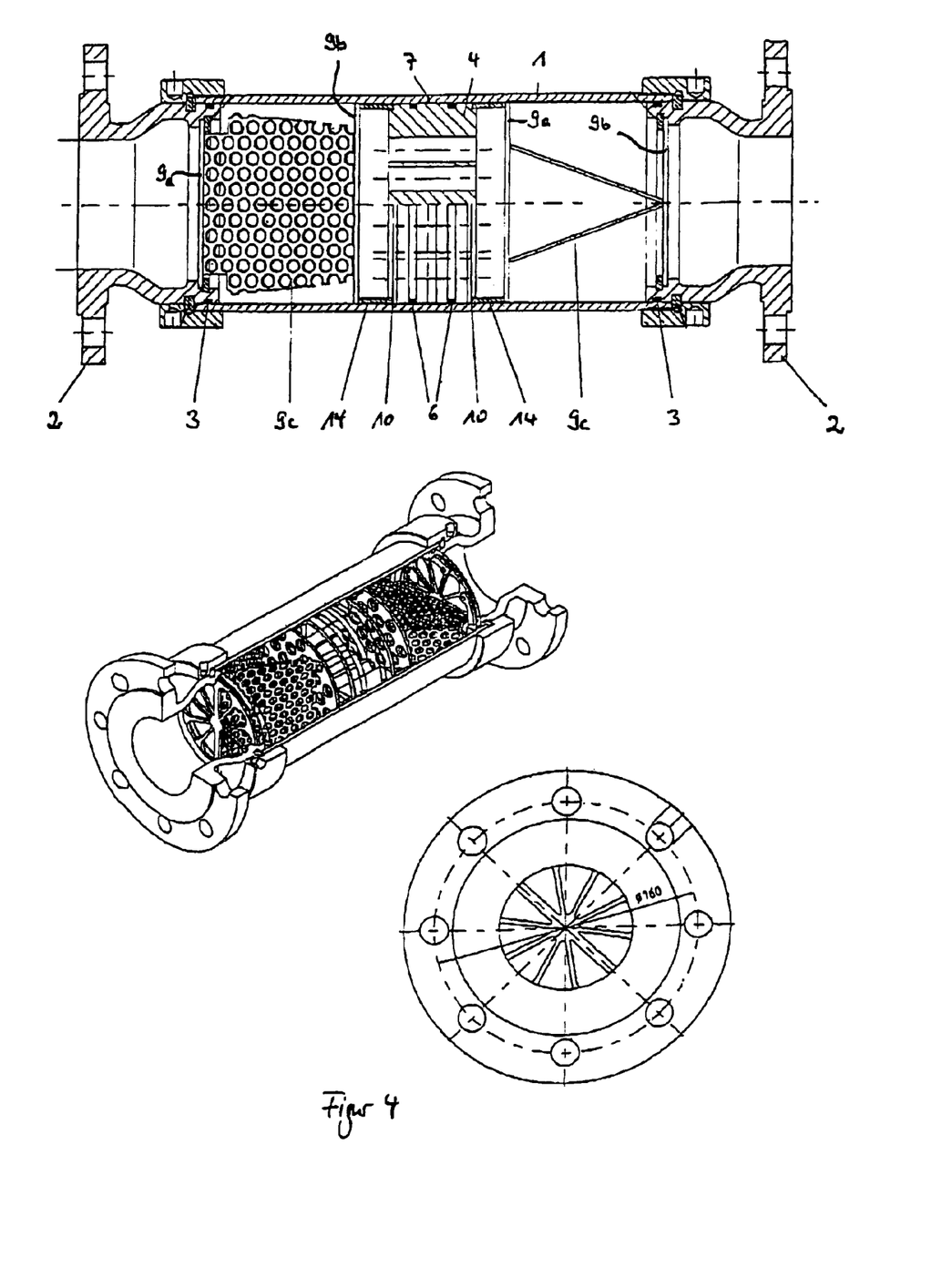

FIG. 4 shows an additional design for water treatment unit in accordance with the patent, which is essentially like FIG. 3 with a metallic casing 1, which is again arranged in the center of a reacting anode 4 with both O rings 6 inserted on the cylindrical surface in the notches. The reacting anode again looks like the typical form in accordance with FIG. 7. In the present case, a connection of the water treatment unit to the water channel network can occur though the appropriately shaped flanges 2. Also, as already described in FIG. 3, the turbulence body includes two perforated plates 9a and 9b, which are arranged perpendicular to the direction of the flow, whereby in the present case, two additional perforated plates 9c are arranged between these perforated plates, which run towards each other to form a V. In this design, various angles can be chosen between the inner perforated plates, for example 30 degrees.

Figure 9:
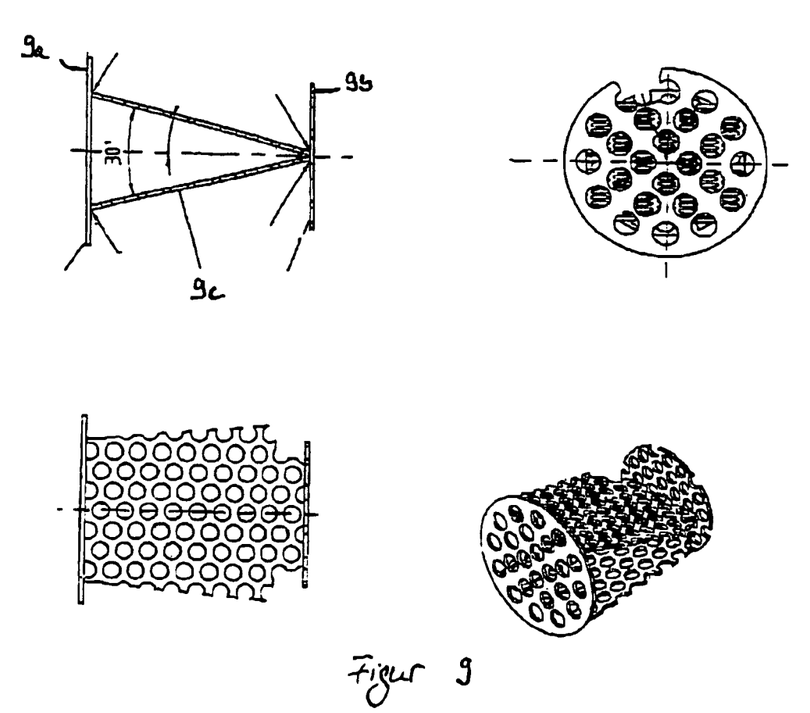
FIG. 9 a turbulence body in accordance with the design referred to in FIG. 4

A turbulence body of this type is shown in more detail for example in FIG. 9 and it is particularly evident in the view in the upper right in FIG. 9, that the water experiences significant disturbances on its flow path from the additional perforated plates 9c, which are arranged between the perpendicular perforated plates. In FIG. 9, it is shown that the holes in the perforated plates that are perpendicular to the direction of the flow have circular cross-sections, whereby in FIG. 4, additional alternative cross section designs, for example somewhat circular segment formed cut outs are shown. It is to be mentioned here that for the holes in the perforated plates, any design can be fundamentally considered.

In this design, it is also evident that the cross-sections of the individual holes not only have various shaping, but also have various sizes.

As already described, a turbulence body 9 is spaced away from the reacting anode 4 through a spacer 14 and is electrically decoupled through an insolating ring 10.

As in essentially all designs here, it is evident, that the design of the perforated plates arranged perpendicular to the direction of the flow is basically circular and is adjusted to the inner diameter of the casing. Here, exactly as in FIG. 4, it is evident in the left side of the reacting anode that the first perpendicular perforated plate 9a is held in the direction of the flow, and also within the beginning of a flange, in particular in an undercut.

Figure 5:
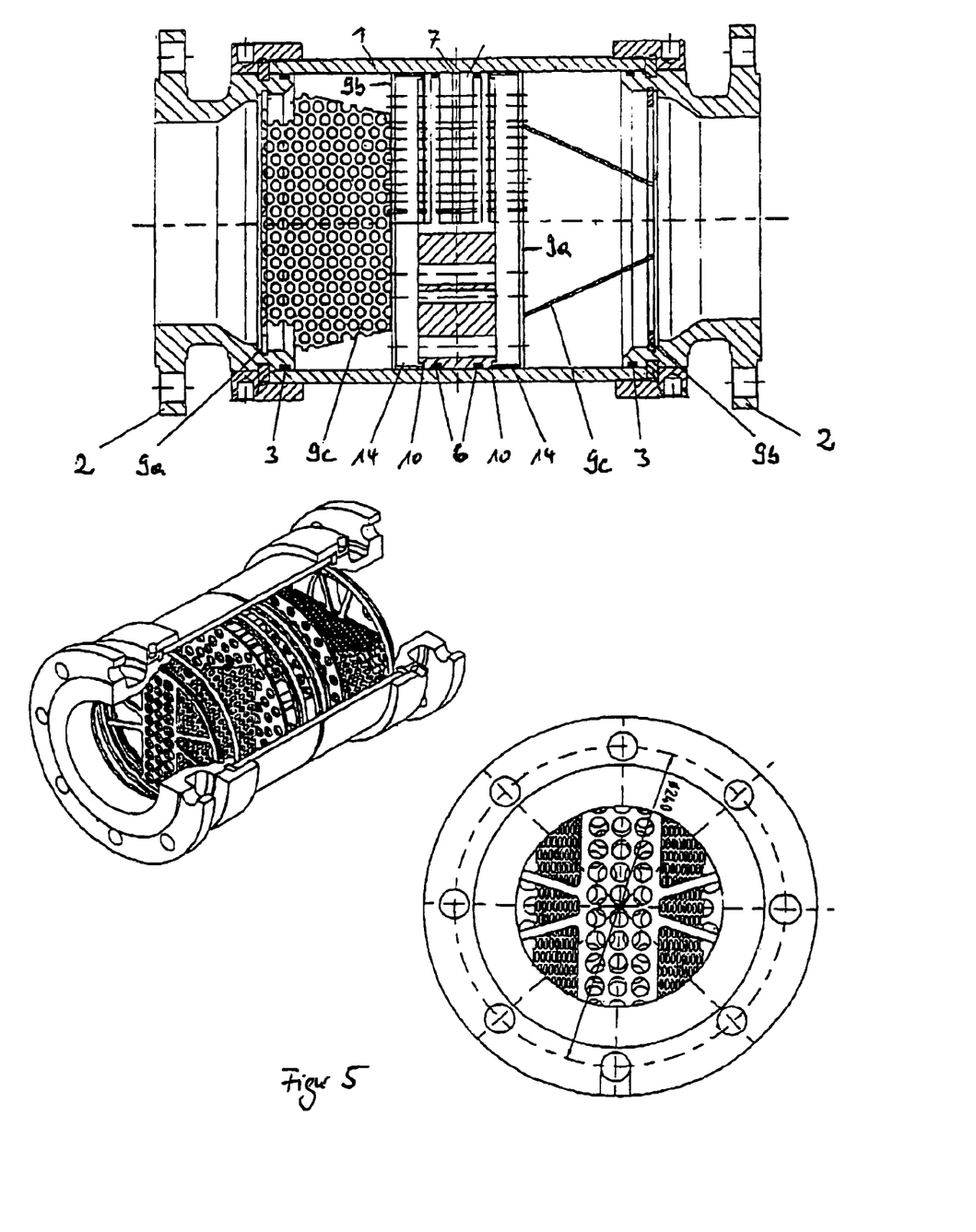

FIG. 5 shows another slightly modified design, in general similar to that in FIG. 4, whereby in this case, however, the perforated plates 9c that both converge on each other in the direction of the flow and are between the two perforated plates 9a and 9b, which are arranged perpendicular to the direction of flow, show an offset to the center axis of the casing 1 between both of their adjacent ends. It is clear, in particular, in the perspective sectional view and in the view in FIG. 5 that the holes are realized here within a plate, in relationship to the first perforated plate 9a, which is arranged perpendicular to the direction of the flow with various cross-section shapes as well as cross-section surfaces. Fundamentally, any styling can be chosen here, whereby the holes can be designed in such a way that there are simply stabilization bars between adjacent holes. In a degeneration, it can be planned that a perforated plate only shows a single or very few large holes, so that such a perforated plate essentially degenerates to a ring and serves as a mounting possibility for the inner perforated plates.

The view from the front of the water treatment unit in accordance with the patent shows clearly here again in FIG. 5, that the water experiences a significant turbulence-generating disturbance in its current flow, by which the positive effects occur.

FIG. 6 shows water treatment unit with a metallic casing in two reacting anodes 4 arranged successively back-to-back without an offset. Independent of the number of anodes, the additional design of both turbulence bodies are realized here through a spirally wound perforated plate 9c, which is arranged between two perpendicular perforated plates 9a and 9b. It is evident here that a connection exists between these perforated plates. The perforated plate shows on its end side, at least one forward springing plate 9d, which can be driven through a groove-shaped cut, for example, in a perpendicular perforated plate and is then attached to the mounting.

The figures described previously show designs by which the characteristics, with regard to the design and the number of turbulence bodies and reacting anodes, are arbitrarily changeable and/or combinable.

The invention claimed is:

1. A water treatment unit comprising:
a metallic casing having proximal and distal ends;
a metallic reacting anode arranged in the metallic casing and electrically conductively connected to the metallic casing; and
a turbulence body arranged within the metallic casing between the proximal end of the metallic casing and the metallic reacting anode, such that in use the turbulence body cleanses the metallic reacting anode by creating turbulent water flow;
wherein, the turbulence body is formed by two perforated plates which are arranged perpendicular to a direction of flow at a distance to each other, between which there is at least one perforated plate, and wherein the two perpendicular plates have a cross-section approximately corresponding to an internal cross-section of the metallic casing.

2. The water treatment unit of claim 1 further comprising an insulating element separating the turbulence body from direct electrical contact with the metallic reacting anode.

3. The water treatment unit of claim 1 further comprising a turbulence body arranged within the metallic casing between the distal end of the metallic casing and the metallic reacting anode.

4. The water treatment unit of claim 3 wherein the turbulence body between the proximal end of the metallic casing and the metallic reacting anode is oriented to have a 90 degree axial offset compared to the turbulence body arranged between the distal end of the metallic casing and the metallic reacting anode.

5. The water treatment unit of claim 1 further comprising a spacer between the turbulence body and the metallic reacting anode, which creates an offset between the turbulence body and the metallic reacting anode.

6. The water treatment unit of claim 1 further comprising a securing element that fixes the turbulence body in its position.

7. The water treatment unit of claim 1 wherein the turbulence body has at least one element through which water can flow through channels and/or holes.

8. The water treatment unit of claim 1 wherein the turbulence body comprises two or more perforated plates that are oriented differently to each other.

9. The water treatment unit of claim 8 wherein the perforated plates are attached to each other with a connector.

10. The water treatment unit of claim 1 wherein the turbulence body comprises a perforated plate with holes wound spirally in the direction of intended fluid flow.

11. The water treatment unit of claim 1 wherein the turbulence body comprises a perforated plate, wherein the perforations have various cross-section shapes and various cross-section sizes.

12. The water treatment unit of claim 1 wherein the turbulence body comprises a perforated plate, wherein the perforations have various cross-section shapes.

13. The water treatment unit of claim 1 wherein the turbulence body comprises a perforated plate, wherein the perforations have various cross-section sizes.

14. The water treatment unit of claim 1, wherein the two perpendicular plates are arranged such that the perforations of one plate are offset in relation to the perforations of the other plate in the flow direction.

15. The water treatment unit of claim 1, further comprising a second perforated plate arranged between the two perpendicular plates, wherein the second perforated plate converges to the at least one perforated plate adjacent to a face of one of the two perpendicular plates.

* * * * *